US011230812B2

United States Patent
Behabtu

(10) Patent No.: US 11,230,812 B2
(45) Date of Patent: Jan. 25, 2022

(54) POLYSACCHARIDE COATINGS FOR PAPER

(71) Applicant: NUTRITION & BIOSCIENCES USA 4, INC, Rochester, NY (US)

(72) Inventor: Natnael Behabtu, Wilmington, DE (US)

(73) Assignee: NUTRITION & BIOSCIENCES USA 4, INC, Wilmington, DE (US)

(*) Notice: Subject to any disclaimer, the term of this patent is extended or adjusted under 35 U.S.C. 154(b) by 0 days.

(21) Appl. No.: 15/756,659

(22) PCT Filed: Oct. 24, 2016

(86) PCT No.: PCT/US2016/058436
§ 371 (c)(1),
(2) Date: Mar. 1, 2018

(87) PCT Pub. No.: WO2017/074859
PCT Pub. Date: May 4, 2017

(65) Prior Publication Data
US 2019/0153674 A1 May 23, 2019

Related U.S. Application Data

(60) Provisional application No. 62/246,349, filed on Oct. 26, 2015, provisional application No. 62/251,191, filed on Nov. 5, 2015.

(51) Int. Cl.
| | |
|---|---|
| D21H 19/52 | (2006.01) |
| C09D 105/02 | (2006.01) |
| D21H 19/62 | (2006.01) |
| D21H 21/16 | (2006.01) |
| C09D 105/00 | (2006.01) |
| C08L 5/02 | (2006.01) |
| C08L 5/00 | (2006.01) |
| D06M 15/11 | (2006.01) |
| D06M 15/03 | (2006.01) |
| B05D 3/10 | (2006.01) |

(52) U.S. Cl.
CPC ............ *D21H 19/52* (2013.01); *B05D 3/10* (2013.01); *C08L 5/00* (2013.01); *C08L 5/02* (2013.01); *C09D 105/00* (2013.01); *C09D 105/02* (2013.01); *D06M 15/03* (2013.01); *D06M 15/11* (2013.01); *D21H 19/62* (2013.01); *D21H 21/16* (2013.01); *D06M 2200/11* (2013.01)

(58) Field of Classification Search
CPC ........ D21H 19/52; D21H 19/62; D21H 21/16; B05D 3/10; C08L 5/00; C08L 5/02; C09D 105/00; C09D 105/02; D06M 15/03; D06M 15/11; D06M 2200/11
See application file for complete search history.

(56) References Cited

U.S. PATENT DOCUMENTS

| | | |
|---|---|---|
| 2,478,425 A | 8/1949 | Richter et al. |
| 2,817,592 A | 12/1957 | Novak et al. |
| 2,988,782 A | 6/1961 | Esperanza et al. |
| 2,992,214 A | 7/1961 | Mench et al. |
| 2,999,788 A | 9/1961 | Morgan |
| 3,068,527 A | 12/1962 | Morgan |
| 3,114,747 A | 12/1963 | Parrish |
| 3,285,765 A | 11/1966 | Cannon |
| 3,833,022 A | 9/1974 | O et al. |
| 4,306,059 A | 12/1981 | Yokobayashi et al. |
| 4,501,886 A | 2/1985 | O'Brien |
| 4,562,020 A | 12/1985 | Hijiya et al. |
| 4,590,107 A | 5/1986 | Bridgeford |
| 4,963,298 A | 10/1990 | Allen et al. |
| 5,248,712 A | 9/1993 | Takeuchi et al. |
| 5,285,765 A | 2/1994 | Lee |
| 5,296,286 A | 3/1994 | Allen et al. |
| 5,496,649 A | 3/1996 | Mallory et al. |
| 5,604,042 A | 2/1997 | Bianchini et al. |
| 5,712,107 A | 1/1998 | Nichols |
| 5,985,666 A | 11/1999 | Loiselle et al. |
| 6,087,559 A | 7/2000 | Nichols |
| 6,127,602 A | 10/2000 | Nichols |
| 6,127,603 A | 10/2000 | Nichols |
| 6,284,479 B1 | 9/2001 | Nichols |
| 6,323,265 B1 | 11/2001 | Bengs et al. |
| 6,323,338 B1 | 11/2001 | Potter et al. |
| 6,410,025 B1 | 6/2002 | Lander |
| 6,444,750 B1 | 9/2002 | Touhsaent |
| 6,465,203 B2 | 10/2002 | Nichols |
| 6,624,300 B2 | 9/2003 | Potter et al. |
| 6,830,803 B2 | 12/2004 | Vaidya et al. |

(Continued)

FOREIGN PATENT DOCUMENTS

| | | |
|---|---|---|
| CN | 1262697 A | 8/2000 |
| CN | 103992978 A | 8/2014 |

(Continued)

OTHER PUBLICATIONS

Khwaldia et al. "Biopolymer Coatings on Paper Packaging Materials" Comprehensive Reviews in Food Science and Food Safety vol. 9, 2010. (Year: 2010).*
Applied Fibre Science, F. Happey, Ed., Chapter 8, E. Atkins, Academic Press, New York, 1979 (Book not included).
Azizi et al., Preparation and Properties of Poly(vinyl alcohol)/Chitosan Blend Bio-nanocomposites Reinforced by Cellulose Nanocrystals, Chinese Journ. of Polymer Science, 2014, vol. 32, No. 12, pp. 1620-1627.
Bao et al., "Chemical Modifications of the (1->3)-@a-d-glucan from Spores of Ganoderma Lucidum and Investigation of Their Physicochemical Properties and Immunological Activity", Carbohydrate Rese, Nov. 8, 2001, vol. 336, No. 2, pp. 127-140.
International Preliminary Report on Patentability, PCT/US2016/058436, Agnes Wittmann Regis, Authorized Officer, WIPO, dated Nov. 5, 2018.

(Continued)

*Primary Examiner* — Robert S Walters, Jr.

(57) ABSTRACT

Coating compositions that can provide grease and oil resistant coating for substrates, especially paper and textile substrates, are disclosed. The coating compositions comprise water insoluble α-(1,3-glucan) polymer and/or dextran polymer and optionally other additives.

13 Claims, No Drawings

(56) References Cited

U.S. PATENT DOCUMENTS

| | | |
|---|---|---|
| 6,902,779 B1 | 6/2005 | De et al. |
| 6,967,027 B1 | 11/2005 | Heux et al. |
| 7,000,000 B1 | 2/2006 | O'Brien |
| 7,341,768 B2 | 3/2008 | De et al. |
| 7,531,073 B2 | 5/2009 | Barron et al. |
| 7,662,451 B2 | 2/2010 | De et al. |
| 8,197,641 B2 | 6/2012 | Esser et al. |
| 8,304,533 B2 | 11/2012 | Karppi et al. |
| 8,551,378 B2 | 10/2013 | Velev et al. |
| 8,642,757 B2 | 2/2014 | O'Brien et al. |
| 8,828,689 B2 | 9/2014 | Caimi et al. |
| 8,852,750 B2 | 10/2014 | Granstrom et al. |
| 8,871,474 B2 | 10/2014 | Payne et al. |
| 8,962,282 B2 | 2/2015 | Caimi et al. |
| 9,034,092 B2 | 5/2015 | O'Brien |
| 9,080,195 B2 | 7/2015 | O'Brien et al. |
| 9,096,956 B2 | 8/2015 | Shiflett et al. |
| 9,139,718 B2 | 9/2015 | Paullin et al. |
| 9,175,423 B2 | 11/2015 | O'Brien et al. |
| 9,212,301 B2 | 12/2015 | O'Brien et al. |
| 9,278,988 B2 | 3/2016 | Kasat et al. |
| 9,334,584 B2 | 5/2016 | O'Brien et al. |
| 9,365,955 B2 | 6/2016 | Opper |
| 9,403,917 B2 | 8/2016 | Kasat et al. |
| 9,540,747 B2 | 1/2017 | O'Brien |
| 9,562,112 B2 | 2/2017 | Landschutze et al. |
| 9,644,322 B2 | 5/2017 | Massouda |
| 9,670,290 B2 | 6/2017 | Landschutze et al. |
| 9,695,253 B2 | 7/2017 | Nambiar et al. |
| 9,701,800 B2 | 7/2017 | Dumberger et al. |
| 9,708,417 B2 | 7/2017 | Cormier et al. |
| 9,714,403 B2 | 7/2017 | Nagy et al. |
| 9,719,121 B2 | 8/2017 | Fake et al. |
| 9,771,548 B2 | 9/2017 | Nagy et al. |
| 9,957,334 B2 | 5/2018 | Dennes et al. |
| 9,982,284 B2 | 5/2018 | Nagy et al. |
| 10,005,850 B2 | 6/2018 | Kasat et al. |
| 10,030,323 B2 | 7/2018 | Durnberger et al. |
| 10,059,779 B2 | 8/2018 | Nambiar et al. |
| 10,072,100 B2 | 9/2018 | Nambiar et al. |
| 10,087,479 B2 | 10/2018 | Fake et al. |
| 10,428,362 B2 | 10/2019 | Nagy et al. |
| 2002/0182376 A1 | 12/2002 | Mukherjee et al. |
| 2004/0091581 A1 | 5/2004 | Joly et al. |
| 2004/0191433 A1 | 9/2004 | Sakaguchi et al. |
| 2007/0207278 A1 | 9/2007 | Mukherjee et al. |
| 2009/0046274 A1 | 2/2009 | McHugh et al. |
| 2010/0003515 A1 | 1/2010 | Tanaka et al. |
| 2012/0132381 A1 | 5/2012 | Hentze et al. |
| 2013/0087938 A1 | 4/2013 | O'Brien et al. |
| 2013/0157316 A1 | 6/2013 | Caimi et al. |
| 2013/0161562 A1 | 6/2013 | O'Brien et al. |
| 2013/0161861 A1 | 6/2013 | O'Brien et al. |
| 2013/0168895 A1 | 7/2013 | Opper |
| 2013/0196384 A1 | 8/2013 | Caimi et al. |
| 2013/0214443 A1 | 8/2013 | Shiflett et al. |
| 2013/0244287 A1 | 9/2013 | O'Brien et al. |
| 2013/0244288 A1 | 9/2013 | O'Brien et al. |
| 2013/0313737 A1 | 11/2013 | O'Brien |
| 2014/0087431 A1 | 3/2014 | Payne et al. |
| 2014/0179913 A1 | 6/2014 | Paullin et al. |
| 2014/0187766 A1 | 7/2014 | Kasat et al. |
| 2014/0187767 A1 | 7/2014 | Kasat et al. |
| 2014/0323715 A1 | 10/2014 | Kasat et al. |
| 2014/0377545 A1 | 12/2014 | Karvitz et al. |
| 2015/0126730 A1 | 5/2015 | O'Brien |
| 2015/0191550 A1 | 7/2015 | Mishra et al. |
| 2015/0225877 A1 | 8/2015 | O'Brien |
| 2015/0232785 A1 | 8/2015 | Paullin et al. |
| 2015/0240278 A1 | 8/2015 | Nagy et al. |
| 2015/0259439 A1 | 9/2015 | Nambiar et al. |
| 2015/0299339 A1 | 10/2015 | Shibakami et al. |
| 2015/0353649 A1 | 12/2015 | Paullin et al. |
| 2015/0368594 A1 | 12/2015 | Nagy et al. |
| 2016/0053061 A1 | 2/2016 | Durnberger et al. |
| 2016/0053406 A1 | 2/2016 | Durnberger et al. |
| 2016/0060792 A1 | 3/2016 | Durnberger et al. |
| 2016/0122445 A1 | 5/2016 | Nambiar et al. |
| 2016/0138195 A1 | 5/2016 | Kraft et al. |
| 2016/0138196 A1 | 5/2016 | Roder et al. |
| 2016/0144065 A1 | 5/2016 | Roder et al. |
| 2016/0175811 A1 | 6/2016 | Behabtu et al. |
| 2016/0177471 A1 | 6/2016 | Kraft et al. |
| 2016/0230348 A1 | 8/2016 | Massouda |
| 2016/0251453 A1 | 9/2016 | Kasat et al. |
| 2016/0304629 A1 | 10/2016 | Kasat et al. |
| 2016/0311935 A1 | 10/2016 | Dennes et al. |
| 2016/0326268 A1 | 11/2016 | Cormier et al. |
| 2016/0326269 A1 | 11/2016 | Dennes et al. |
| 2016/0333117 A1 | 11/2016 | Massouda et al. |
| 2016/0333157 A1 | 11/2016 | Massouda et al. |
| 2017/0167063 A1 | 6/2017 | Behabtu |
| 2017/0196231 A1 | 7/2017 | Massouda et al. |
| 2017/0198108 A1* | 7/2017 | Mishra ............... C08B 37/0009 |
| 2017/0198109 A1 | 7/2017 | Mishra et al. |
| 2017/0198322 A1 | 7/2017 | Cheng et al. |
| 2017/0198323 A1 | 7/2017 | Cheng et al. |
| 2017/0198324 A1 | 7/2017 | Cheng et al. |
| 2017/0204203 A1 | 7/2017 | Massouda et al. |
| 2017/0204232 A1 | 7/2017 | Vindhya |
| 2017/0204442 A1 | 7/2017 | Dicosimo et al. |
| 2017/0208823 A1 | 7/2017 | Massouda et al. |
| 2017/0218093 A1 | 8/2017 | Cheng et al. |
| 2017/0267787 A1 | 9/2017 | Nambiar et al. |
| 2017/0298303 A1 | 10/2017 | Nagy et al. |
| 2017/0362345 A1 | 12/2017 | Behabtu et al. |
| 2018/0021238 A1* | 1/2018 | Huh ....................... A23L 27/60 424/401 |
| 2018/0049457 A1 | 2/2018 | Cheng et al. |
| 2018/0066214 A1 | 3/2018 | Nagy et al. |
| 2018/0119357 A1 | 5/2018 | Behabtu et al. |
| 2018/0127682 A1 | 5/2018 | Nambiar et al. |
| 2018/0223002 A1 | 8/2018 | Dennes et al. |
| 2018/0230241 A1 | 8/2018 | Johnson et al. |
| 2018/0258590 A1 | 9/2018 | Behabtu et al. |
| 2018/0273731 A1* | 9/2018 | Opietnik ..................... C08J 3/05 |
| 2019/0153674 A1 | 5/2019 | Behabtu |
| 2019/0186049 A1 | 6/2019 | Durnberger et al. |
| 2019/0218373 A1 | 7/2019 | Opietnik et al. |

FOREIGN PATENT DOCUMENTS

| | | |
|---|---|---|
| EP | 0770002 B1 | 1/2004 |
| EP | 2418090 A2 | 2/2012 |
| WO | 9601736 A1 | 1/1996 |
| WO | 2005/053765 A1 | 6/2005 |
| WO | 2006/036092 A1 | 4/2006 |
| WO | 2008/002618 A2 | 1/2008 |
| WO | 2013/036918 A2 | 3/2013 |
| WO | 2013/036968 A1 | 3/2013 |
| WO | 2013/052730 A1 | 4/2013 |
| WO | 2013/066246 A1 | 5/2013 |
| WO | 2013/096502 A1 | 6/2013 |
| WO | 2013/096511 A1 | 6/2013 |
| WO | 2013/101854 A1 | 7/2013 |
| WO | 2013/177348 A1 | 11/2013 |
| WO | 2014/052386 A2 | 4/2014 |
| WO | 2014/077340 A1 | 5/2014 |
| WO | 2014/095762 A1 | 6/2014 |
| WO | 2014/099724 A1 | 6/2014 |
| WO | 2014/105696 A1 | 7/2014 |
| WO | 2014/105698 A1 | 7/2014 |
| WO | 2014/161018 A1 | 10/2014 |
| WO | 2014/161019 A1 | 10/2014 |
| WO | 2014/165881 A1 | 10/2014 |
| WO | 2014/201479 A1 | 12/2014 |
| WO | 2014/201480 A1 | 12/2014 |
| WO | 2014/201481 A1 | 12/2014 |
| WO | 2014/201482 A1 | 12/2014 |
| WO | 2014/201483 A1 | 12/2014 |
| WO | 2014/201484 A1 | 12/2014 |
| WO | 2015/069828 A1 | 5/2015 |
| WO | 2015/095046 A1 | 6/2015 |
| WO | 2015/095358 A1 | 6/2015 |

(56) References Cited

FOREIGN PATENT DOCUMENTS

| WO | WO-2015094402 A1 | * | 6/2015 | ............... | C08J 5/18 |
|----|------------------|---|--------|-----------------|-----------|
| WO | 2015/109064 A1 | | 7/2015 | | |
| WO | 2015/109066 A1 | | 7/2015 | | |
| WO | 2015/109164 A1 | | 7/2015 | | |
| WO | WO-2015103531 | * | 7/2015 | ............... | C08J 5/18 |
| WO | 2015/123323 A1 | | 8/2015 | | |
| WO | 2015/123327 A1 | | 8/2015 | | |
| WO | 2015/130881 A1 | | 9/2015 | | |
| WO | 2015/130883 A1 | | 9/2015 | | |
| WO | 2015/138283 A1 | | 9/2015 | | |
| WO | 2015/183714 A1 | | 12/2015 | | |
| WO | 2015/183721 A1 | | 12/2015 | | |
| WO | 2015/183722 A1 | | 12/2015 | | |
| WO | 2015/183724 A1 | | 12/2015 | | |
| WO | 2015/183726 A1 | | 12/2015 | | |
| WO | 2015/183729 A1 | | 12/2015 | | |
| WO | 2015/195777 A1 | | 12/2015 | | |
| WO | 2015/195960 A1 | | 12/2015 | | |
| WO | 2015/200589 A1 | | 12/2015 | | |
| WO | 2015/200590 A1 | | 12/2015 | | |
| WO | 2015/200593 A1 | | 12/2015 | | |
| WO | 2015/200596 A1 | | 12/2015 | | |
| WO | 2015/200605 A1 | | 12/2015 | | |
| WO | 2015/200612 A1 | | 12/2015 | | |
| WO | 2016/073732 A1 | | 5/2016 | | |
| WO | 2016/105971 A1 | | 6/2016 | | |
| WO | 2016/106011 A1 | | 6/2016 | | |
| WO | 2016/106068 A1 | | 6/2016 | | |
| WO | 2016/126685 A1 | | 8/2016 | | |
| WO | 2016/133734 A1 | | 8/2016 | | |
| WO | 2016/160737 A1 | | 10/2016 | | |
| WO | 2016/160738 A2 | | 10/2016 | | |
| WO | 2016/160740 A1 | | 10/2016 | | |
| WO | 2016/196021 A1 | | 12/2016 | | |
| WO | 2016/196022 A1 | | 12/2016 | | |
| WO | 2016/200264 A1 | | 12/2016 | | |
| WO | 2017/040369 A1 | | 3/2017 | | |
| WO | 2017/074862 A1 | | 5/2017 | | |

OTHER PUBLICATIONS

Kiho et al., (1->3)-alpha-D-glucan from an alkaline extract of agrocybe cylindracea and antitumor activity of its 0-(carboxymethyl)ated derivatives, Carbohydrate Research, 1989, vol. 189, pp. 273-279.
Kjellgren, H. et al., "Barrier and surface Properties of Chitosan-Coated Greaseproof Paper", Carbohydrate Polymers, 65 (2006) 453-460.
Kralj, et al., "Glucan Synthesis in the Genus Lactobacillus: Isolation and Characterization of Glucansucrase Genes, Enzymes and Glucan Products from Six Different Strains", Microbiology (2004), 150, 3681-3690.
Marsh, K. et al., "Food Packaging—Roles, Materials, and Environmental Issues", J Food Science, vol. 72, No. 3, 2007, R39-R55.
Ogawa et al., 'Conformation of (1-3)-to-glucan tribenzoate,' Biosci Biotech Biochem, 1993, vol. 57 (10), pp. 1663-1665.
Ogawa et al., 'Crystal structure of (1->3)-alpha-d-glucan,' Water-soluble polymers: synthesis, solution properties and applications, American Chemical Society, Jan. 1, 1980, vol. 141, pp. 353-362.
Ogawa et al., 'Molecular and crystal structure of the regenerated form of (l>3)-alpha-d-glucan,' International Journal of Biological Macromolecules, Feb. 1, 1981, vol. 3, No. 1, pp. 31-36.
Ogawa et al., 'X-ray diffraction data for (1>3)-alpha-d-glucan triacetate,' Carbohydrate Polymers, Jan. 1, 1983, vol. 3, No. 4, pp. 287-297.
Ogawa et al., 'X-ray diffraction data for (l>3)-alpha-d-glucan,' Carbohydrate Research, Oct. 1, 1979, vol. 75, pp. CI3-CI6.
Paralikar et al., "Poly(vinyl alcohol)/cellulose nanocrystal barrier membranes", Journ. of Membrane Science, 2008, vol. 320, pp. 248-258.

Paulo et al., 'Production, extraction and characterization of exopolysaccharides produced by the native Leuconostoc pseudomesenteroides R2 strain,' Anais da Academia Brasileira de Ciencias, Jan. 1, 2012, vol. 84, No. 2, pp. 495-508.
PCT International Search Report and Written Opinion issued for PCT/US2016/049194, dated Dec. 2, 2016.
PCT International Search Report and Written Opinion issued for PCT/US2013/076905, dated Mar. 4, 2014.
PCT International Search Report and Written Opinion issued for PCT/US2013/076919, dated Mar. 3, 2014.
PCT International Search Report and Written Opinion issued for PCT/US2014/044281, dated Sep. 11, 2014.
PCT International Search Report and Written Opinion issued for PCT/US2015/010139, dated Apr. 29, 2015.
PCT International Search Report and Written Opinion issued for PCT/US2015/011546, dated May 28, 2015.
PCT International Search Report and Written Opinion issued for PCT/US2015/011551, dated Jul. 9, 2015.
PCT International Search Report and Written Opinion issued for PCT/US2015/011724, dated May 15, 2015.
PCT International Search Report and Written Opinion issued for PCT/US2015/037622, dated Sep. 22, 2015.
PCT International Search Report and Written Opinion issued for PCT/US2015/037624, dated Oct. 12, 2015.
PCT International Search Report and Written Opinion issued for PCT/US2015/037628, dated Sep. 22, 2015.
PCT International Search Report and Written Opinion issued for PCT/US2015/037634, dated Sep. 22, 2015.
PCT International Search Report and Written Opinion issued for PCT/US2015/037646, dated Oct. 7, 2015.
PCT International Search Report and Written Opinion issued for PCT/US2015/037656, dated Oct. 7, 2015.
PCT International Search Report and Written Opinion issued for PCT/US2015/066317, dated Mar. 30, 2016.
PCT International Search Report and Written Opinion issued for PCT/US2016/016136, dated Apr. 4, 2016.
PCT International Search Report and Written Opinion issued for PCT/US2016/033245, dated Aug. 22, 2016.
PCT International Search Report and Written Opinion issued for PCT/US2016/033249, dated Jul. 26, 2016.
PCT International Search Report and Written Opinion issued for PCT/US2016/058436, dated Feb. 8, 2017.
PCT International Search Report and Written Opinion issued for PCT/US2016/058453, dated Jan. 5, 2017.
Shida et al., 'A (1/AR3-)-Alpha-D-Glucan isolated from the fruit bodies of lentinus edodes,' Carbohydrate Research, 1978, vol. 60, No. 1, pp. 117-127.
Shimamura et al., "Identification of Amino Acid Residues in *Streptococcus mutans* Glucosyltransferases Influencing the Structure of the Glucan Product", J. Bacteriology, vol. 176, No. 16, pp. 4845-4850, 1994.
Simpson et al., 'Four glucosyltransferases, GtfJ, GtfK, GtfL and GtfM from *Streptococcus salivarius* ATCC 25975,' Microbiology, 1995, vol. 141, pp. 1451-1460.
Smoukov et al., 'Scalable liquid Shear-Driven Fabrication of Polymer Nanofibers,' Adv. Mater. 2015, 27, p. 2642-2647.
Synytsya et al., 'Structural analysis of glucans,' Annals of Translational Medicine, Feb. 1, 2014, vol. 2, No. 2, 14 pages.
Villares et al., 'Structural features and healthy properties of polysaccharides occurring in mushrooms,' Agriculture, Dec. 18, 2012, vol. 2, No. 4, pp. 452-471.
Zhang et al., 'Dissolution and regeneration of cellulose in NaOH/Thiourea Aqueous Solution,' J Polym Sci Part B: Polym Phys, 2002, vol. 40, pp. 1521-1529.
Zhang et al., 'Effects of urea and sodium hydroxide on the molecular weight and conformation of alpha-(1->3)-d-glucan from Lentinus edodes in aqueous solution,' Carbohydrate Research, Aug. 7, 2000, vol. 327, No. 4, pp. 431-438.

* cited by examiner

POLYSACCHARIDE COATINGS FOR PAPER

CROSS REFERENCE TO RELATED APPLICATIONS

This application claims the benefit of priority of United States Provisional Application Nos. 62/246,349, filed on Oct. 26, 2015, and 62/251,191, filed on Nov. 5, 2015, the entire disclosures of which are hereby incorporated by reference.

FIELD OF THE DISCLOSURE

The present disclosure is directed towards coating compositions that can provide grease and oil resistant coatings for substrates, especially cellulose, textile, and polymeric substrates. The coating compositions comprise A) water insoluble α-(1,3-glucan) polymer and/or B) water soluble α-(1,6→glucan) polymer that can form a continuous layer on the substrate. The substrates can be useful for food packaging applications and importantly, can easily be recycled.

BACKGROUND OF THE DISCLOSURE

The paper and packaging industry utilizes many types of coating compositions for various cellulosic substrates, depending upon their final use. In order to produce oil and grease resistant paper, a paper can be produced by densifying, which involves beating the pulp for long periods of time prior to paper formation. In other methods, the paper surface can be coated with a polymer, for example polyethylene, or treated with finishes such as fluorocarbon polymers. Paper coated with synthetic polymers tends to be difficult to recycle. There is a continuing need to produce paper that has adequate grease and oil resistance and is able to be recycled.

SUMMARY OF THE DISCLOSURE

The disclosure relates to a substrate wherein at least a portion of the substrate is coated with a continuous layer of a coating composition, wherein the coating composition comprises A) water insoluble α-(1,3-glucan) polymer having 90% or greater α-1,3-glycosidic linkages, less than 1% by weight of α-1,3,6-glycosidic branch points and a number average degree of polymerization in the range of from 55 to 10,000 and/or B) dextran comprising:
  (i) 87-93% α-1,6 glycosidic linkages;
  (ii) 0.1-1.2% α-1,3-glycosidic linkages;
  (iii) 0.1-0.7% α-1,4-glycosidic linkages;
  (iv) 7.7-8.6% α-1,3,6-glycosidic linkages; and
  (v) 0.4-1.7% α-1,2,6-glycosidic or α-1,4,6-glycosidic linkages;
wherein the weight-average molecular weight (Mw) of the dextran is about 50-200 million Daltons, and the z-average radius of gyration of the dextran is about 200-280 nm.

The disclosure also relates to a method comprising:
  1) providing a coating composition comprising A) water insoluble α-(1,3-glucan) polymer having 90% or greater α-1,3-glycosidic linkages, less than 1% by weight of α-1,3,6-glycosidic branch points and a number average degree of polymerization in the range of from 55 to 10,000 in aqueous alkali metal hydroxide and/or B) dextran in water, wherein the dextran comprises:
  (i) 87-93% α-1,6 glycosidic linkages;
  (ii) 0.1-1.2% α-1,3-glycosidic linkages;
  (iii) 0.1-0.7% α-1,4-glycosidic linkages;
  (iv) 7.7-8.6% α-1,3,6-glycosidic linkages; and
  (v) 0.4-1.7% α-1,2,6-glycosidic or α-1,4,6-glycosidic linkages;
wherein the weight-average molecular weight (Mw) of the dextran is about 50-200 million Daltons, and the z-average radius of gyration of the dextran is about 200-280 nm;
  2) applying a layer of the aqueous coating composition solution to a substrate; and
  3) removing at least a portion of the water from the applied layer;
wherein the dried layer of coating composition forms a continuous layer on the substrate.

In addition, the disclosure relates to a substrate wherein at least a portion of the substrate is coated with a continuous layer of a coating composition, wherein the coating composition comprises quaternary ammonium poly alpha-1,3-glucan.

DETAILED DESCRIPTION OF THE DISCLOSURE

The disclosures of all cited patent and non-patent literature are incorporated herein by reference in their entirety.

As used herein, the term "embodiment" or "disclosure" is not meant to be limiting, but applies generally to any of the embodiments defined in the claims or described herein. These terms are used interchangeably herein.

Unless otherwise disclosed, the terms "a" and "an" as used herein are intended to encompass one or more (i.e., at least one) of a referenced feature.

The features and advantages of the present disclosure will be more readily understood, by those of ordinary skill in the art from reading the following detailed description. It is to be appreciated that certain features of the disclosure, which are, for clarity, described above and below in the context of separate embodiments, may also be provided in combination in a single element. Conversely, various features of the disclosure that are, for brevity, described in the context of a single embodiment, may also be provided separately or in any sub-combination. In addition, references to the singular may also include the plural (for example, "a" and "an" may refer to one or more) unless the context specifically states otherwise.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

As used herein:

The term "starch" means a polymeric carbohydrate consisting of amylose and amylopectin.

The term "hydroxyalkyl starch" means an ether derivative of partially hydrolyzed natural starches, in which hydroxyl groups in the starch are hydroxyl alkylated.

The phrase "water insoluble" means that less than 5 grams of the substance, for example, the α-(1,3-glucan) polymer, dissolves in 100 milliliters of water at 23° C. In other embodiments, water insoluble means that less than 4 grams or 3 grams or 2 grams or 1 gram of the substance is dissolved in water at 23° C.

The phrase "α-(1,3-glucan) polymer" means a polysaccharide comprising glucose monomer units linked together by glycosidic linkages wherein at least 50% of the glycosidic linkages are α-1,3-glycosidic linkages. In other embodiments, the percentage of α-1,3-glycosidic linkages can be greater than or equal to 90%, 95%, 96%, 97%, 98%, 99% or 100% (or any integer value between 50% and 100%). Accordingly, the α-(1,3-glucan) polymer comprises less than or equal to 10%, 5%, 4%, 3%, 2%, 1% or 0% of glycosidic linkages that are not α-1,3-glycosidic linkages. The α-(1,3-glucan) polymer also has a number average degree of polymerization in the range of from 55 to 10,000.

The terms "dextran", "dextran polymer" and "dextran compound" are used interchangeably herein and refer to complex, branched alpha-glucans generally comprising chains of substantially (mostly) alpha-1,6-linked glucose monomers, with side chains (branches) linked mainly by alpha-1,3-linkage. The term "gelling dextran" herein refers to the ability of one or more dextrans disclosed herein to form a viscous solution or gel-like composition (i) during enzymatic dextran synthesis and, optionally, (ii) when such synthesized dextran is isolated (e.g., >90% pure) and then placed in an aqueous composition.

Dextran "long chains" herein can comprise "substantially [or mostly] alpha-1,6-glycosidic linkages", meaning that they can have at least about 98.0% alpha-1,6-glycosidic linkages in some aspects. Dextran herein can comprise a "branching structure" (branched structure) in some aspects. It is contemplated that in this structure, long chains branch from other long chains, likely in an iterative manner (e.g., a long chain can be a branch from another long chain, which in turn can itself be a branch from another long chain, and so on). It is contemplated that long chains in this structure can be "similar in length", meaning that the length (DP [degree of polymerization]) of at least 70% of all the long chains in a branching structure is within plus/minus 30% of the mean length of all the long chains of the branching structure.

Dextran in some embodiments can also comprise "short chains" branching from the long chains, typically being one to three glucose monomers in length, and comprising less than about 10% of all the glucose monomers of a dextran polymer. Such short chains typically comprise alpha-1,2-, alpha-1,3-, and/or alpha-1,4-glycosidic linkages (it is believed that there can also be a small percentage of such non-alpha-1,6 linkages in long chains in some aspects).

The terms "glycosidic linkage" refers to the type of covalent bond that joins a carbohydrate (sugar) molecule to another group such as another carbohydrate. The term "alpha-1,3-glycosidic linkage" as used herein refers to the type of covalent bond that joins alpha-D-glucose molecules to each other through carbons 1 and 3 on adjacent alpha-D-glucose rings. The term "alpha-1,6-glycosidic linkage" as used herein refers to the covalent bond that joins alpha-D-glucose molecules to each other through carbons 1 and 6 on adjacent alpha-D-glucose rings. Herein, "alpha-D-glucose" will be referred to as "glucose".

The "molecular weight" of dextran herein can be represented as number-average molecular weight (Mn) or as weight-average molecular weight (Mw), the units of which are in Daltons or grams/mole.

Alternatively, molecular weight can be represented as DPw (weight average degree of polymerization) or DPn (number average degree of polymerization). Various means are known in the art for calculating these molecular weight measurements such as with high-pressure liquid chromatography (HPLC), size exclusion chromatography (SEC), or gel permeation chromatography (GPC).

The term "radius of gyration" (Rg) herein refers to the mean radius of dextran, and is calculated as the root-mean-square distance of a dextran molecule's components (atoms) from the molecule's center of gravity. Rg can be provided in Angstrom or nanometer (nm) units, for example, The "z-average radius of gyration" of dextran herein refers to the Rg of dextran as measured using light scattering (e.g., MALS). Methods for measuring z-average Rg are known and can be used herein, accordingly. For example, z-average Rg can be measured as disclosed in U.S. Pat. No. 7,531,073, U.S. Patent Appl. Publ. Nos. 2010/0003515 and 2009/0046274, Wyatt (*Anal. Chim. Acta* 272:1-40), and Mori and Barth (Size Exclusion Chromatography, Springer-Verlag, Berlin, 1999), all of which are incorporated herein by reference.

The phrase "continuous layer" means a layer of a composition applied to at least a portion of a substrate, wherein a dried layer of the composition covers greater than or equal to 99% of the surface to which it has been applied and having less than 1% voids in the layer that expose the substrate surface. The greater than or equal to 99% of the surface to which the layer has been applied excludes any area of the substrate to which the layer has not been applied. For example, a continuous layer can be applied to only a portion of a substrate and still be considered a continuous layer to the area which the layer has been applied. A layer of the dried coating composition forms a continuous layer of individual polymeric macromolecules. It is believed that the individual macromolecules are interconnected by chain entanglement. Therefore, a continuous layer of the coating composition can also be characterized as continuous by forming a free-standing layer and stretching the sample. The continuous layer will have an elongation to break of greater than 5%.

The phrase "coating composition" refers to all of the solid components that form the layer on the substrate, for example, the water insoluble α-(1,3-glucan) polymer and/or the dextran polymer, as well as optional pigment, surfactant, dispersing agent, binder, crosslinking agent, and/or other additives. The term solid is used even though some of the components may be liquids at or below room temperature.

The phrase "aqueous coating composition" refers to the coating composition further comprising an aqueous carrier. In some embodiments, the aqueous carrier is water. In other embodiments, the aqueous carrier can be water having a pH of greater than 7.0 due to the addition of a base. The base can be sodium hydroxide or potassium hydroxide, for example. After being applied to a substrate, at least a portion of the water is removed to form the layer of the coating composition on the substrate. Removing at least a portion of the aqueous carrier means to remove greater than or equal to 50% by weight of the aqueous carrier. In other embodiments, greater than or equal to 90% or 95% or 99% by weight of the aqueous carrier is removed. Water content can be assessed by Karl Fischer titration.

The phrase "consists essentially of" means that the composition contains all of the recited components and less than 5% by weight, based on the total weight of the composition of any other component or combination of components. For example, a composition consisting essentially of A and B must contain at least 95% by weight of A and B and no more than 5% by weight of any other component or combination components, wherein the percentage by weight is based on the total weight of the composition. In other embodiments, the phrase consisting essentially of means that the composition contains less than 4% or 3% or 2% or 1% or less than 0.5% by weight of the components that are not recited, based on the total weight of the composition.

In some embodiments, the substrate is coated with a continuous layer of a coating composition, wherein the coating composition comprises water insoluble α-(1,3-glucan) polymer having 90% or greater α-1,3-glycosidic linkages, less than 1% by weight of α-1,3,6-glycosidic branch points and a number average degree of polymerization in the range of from 55 to 10,000. In other embodiments, the coating composition consists essentially of the water insoluble α-(1,3-glucan) polymer having 95% or greater α-1,3-glycosidic linkages, less that 1% by weight of α-1,3,6-glycosidic branch points and a number average degree of polymerization in the range of from 55 to 10,000. In still further embodiments, the coating composition consists essentially of the water insoluble α-(1,3-glucan) polymer having 99% or greater α-1,3-glycosidic linkages, less that 1% by weight of α-1,3,6-glycosidic branch points and a number average degree of polymerization in the range of from 55 to 10,000.

In other embodiments, the substrate is coated with a continuous layer of a coating composition, wherein the coating composition comprises dextran, wherein the dextran comprises:
(i) 87-93% α-1,6 glycosidic linkages;
(ii) 0.1-1.2% α-1,3-glycosidic linkages;
(iii) 0.1-0.7% α-1,4-glycosidic linkages;
(iv) 7.7-8.6% α-1,3,6-glycosidic linkages;
(v) 0.4-1.7% α-1,2,6-glycosidic or α-1,4,6-glycosidic linkages;
wherein the weight-average molecular weight (Mw) of the dextran is about 50-200 million Daltons, and the z-average radius of gyration of the dextran is about 200-280 nm. In other embodiments, the coating composition consists essentially of the dextran polymer having (i) about 89.5-90.5 wt % glucose linked at positions 1 and 6; (ii) about 0.4-0.9 wt % glucose linked at positions 1 and 3; (iii) about 0.3-0.5 wt % glucose linked at positions 1 and 4; (iv) about 8.0-8.3 wt % glucose linked at positions 1, 3 and 6; and (v) about 0.7-1.4 wt % glucose linked at: (a) positions 1, 2 and 6, or (b) positions 1, 4 and 6.

The present disclosure also relates to a method of forming a layer of a coating composition on a substrate comprising:
1) providing an aqueous coating composition;
   wherein the aqueous coating composition comprises i) water insoluble α-(1,3-glucan) polymer having 90% or greater α-1,3-glycosidic linkages, less than 1% by weight of α-1,3,6-glycosidic branch points and a number average degree of polymerization in the range of from 55 to 10,000; and ii) aqueous sodium hydroxide or aqueous potassium hydroxide;
2) applying a layer of the aqueous coating composition to at least a portion of the substrate; and
3) removing at least a portion of the water from the applied layer;
wherein the dried layer of coating composition forms a continuous layer on the substrate.

In other embodiments, the disclosure also relates to a method of forming a layer of a coating composition on a substrate comprising:
1) providing an aqueous coating composition; wherein the aqueous coating composition comprises dextran in water and wherein the dextran comprises:
   (i) 87-93% α-1,6 glycosidic linkages;
   (ii) 0.1-1.2% α-1,3-glycosidic linkages;
   (iii) 0.1-0.7% α-1,4-glycosidic linkages;
   (iv) 7.7-8.6% α-1,3,6-glycosidic linkages;
   (v) 0.4-1.7% α-1,2,6-glycosidic or α-1,4,6-glycosidic linkages;
   wherein the weight-average molecular weight (Mw) of the dextran is about 50-200 million Daltons, and the z-average radius of gyration of the dextran is about 200-280 nm;
2) applying a layer of the aqueous coating composition to at least a portion of the substrate; and
3) removing at least a portion of the water from the applied layer;
wherein the dried layer of coating composition forms a continuous layer on the substrate.

It has been found that when a layer of coating composition comprising the water insoluble α-(1,3-glucan) polymer or the dextran polymer is applied to a substrate, the applied layer of coating composition resists grease and/or oil. This means that the applied layer of coating composition provides protection to the substrate so that grease and/or oil does not penetrate the substrate.

The water insoluble α-(1,3-glucan) polymer can be produced using an enzymatic method, for example, a method using glucosyl transferase enzymes as provided by U.S. Pat. Nos. 7,000,000 or 8,871,474. In some embodiments, the water insoluble α-(1,3-glucan) polymer is produced by a glucosyltransferase enzyme having 90% or greater sequence identity to Gtf J. An enzymatic production of the water insoluble α-(1,3-glucan) polymer can result in a number average degree of polymerization (DPn) in the range of from 55 to 10,000. In other embodiments, the DPn can be in the range of from 75 to 1,000 and, in still further embodiments, in the range of from 100 to 800. The number average degree of polymerization can be determined by size exclusion chromatography.

The enzymes disclosed in the above references are also particularly useful for producing water insoluble fiber having greater than or equal to 90% α-1,3-glycosidic linkages. The water insoluble α-1,3-glucan) polymer comprising greater than or equal to 90% α-1,3-glycosidic linkages is herein to be considered a linear polymer having a homogeneous structure. By homogeneous structure is meant that the water insoluble α-(1,3-glucan) polymer has less than 10% linkages that are not α-1,3-glycosidic linkages, for example, α-1,6-glycosidic linkages α-1,4-glycosidic linkages or α-1,3,6-glycosidic branch points. In other embodiments, the water insoluble α-(1,3-glucan) polymer comprises less than 9% or 8% or 7% or 6% or 5% or 4% or 3% or 2% or 1% of glycosidic linkages that are not α-1,3-linkages. In still further embodiments, the water insoluble α-(1,3-glucan) polymer is a linear polymer having greater than or equal to 95% or 96% or 97% or 98% or 99% of α-1,3-glycosidic linkages and less than 1% α-1,3,6-glycosidic branch points. As used herein the percentage of α-1,3-glycosidic linkages refers to the average number of monomer units that are linked via α-1,3-linkages divided by the total number of monomer units in the polymer composition (×100). The percentage of α-1,3-glycosidic linkages is determined via integration of the peaks in a $^1$H NMR spectra, wherein a sample of the water insoluble α-(1,3-glucan) polymer is solvated in $d_6$-dimethyl sulfoxide (DMSO) containing 3 percent by weight LiCl and 0.1 milliliters of trifluoroacetic acid in $d_6$-DMSO. The percentages of linkages that are not α-1,3-glycosidic linkages can be determined in the same manner and using the same general formula.

The dextran polymer can be produced via an enzymatic process using glucosyltransferase enzyme comprising an amino acid sequence that is described in U.S. Provisional Application No. 62/075,460 (filed Nov. 5, 2014) and in corresponding US Patent Application Publication 2016/0122445 A1, both of which are incorporated herein by reference in their entirety. In some embodiments, the dextran is not a product of *Leuconostoc mesenteroides* glucosyltransferase enzyme. In other embodiments, the dextran can comprise (i) about 87-93 wt % glucose linked only at positions 1 and 6; (ii) about 0.1-1.2 wt % glucose linked only at positions 1 and 3; (iii) about 0.1-0.7 wt % glucose linked only at positions 1 and 4; (iv) about 7.7-8.6 wt % glucose linked only at positions 1, 3 and 6; and (v) about 0.4-1.7 wt % glucose linked only at: (a) positions 1, 2 and 6, or (b) positions 1, 4 and 6. In certain embodiments, a dextran can comprise (i) about 89.5-90.5 wt % glucose linked only at positions 1 and 6; (ii) about 0.4-0.9 wt % glucose linked only at positions 1 and 3; (iii) about 0.3-0.5 wt % glucose linked only at positions 1 and 4; (iv) about 8.0-8.3 wt % glucose linked only at positions 1, 3 and 6; and (v) about 0.7-1.4 wt % glucose linked only at: (a) positions 1, 2 and 6, or (b) positions 1, 4 and 6.

In other embodiments, the dextran polymer can comprise about 87, 87.5, 88, 88.5, 89, 89.5, 90, 90, 5, 91, 91.5, 92, 92.5, or 93 wt % glucose linked only at positions 1 and 6. There can be about 87-92.5, 87-92, 87-91.5, 87-91, 87-90.5, 87-90, 87.5-92.5, 87.5-92, 87.5-91.5, 87.5-91, 87.5-90.5, 87.5-90, 88-92.5, 88-92, 88-91.5, 88-91, 88-90.5, 88-90, 88.5-92.5, 88.5-92, 88.5-91.5, 88.5-91, 88.5-90.5, 88.5-90, 89-92.5, 89-92, 89-91.5, 89-91, 89-90.5, 89-90, 89.5-92.5, 89.5-92, 89.5-91.5, 89.5-91, or 89.5-90.5 wt % glucose linked only at positions 1 and 6, in some instances.

In other embodiments, the dextran polymer can comprise about 0.1, 0.2, 0.3, 0.4, 0.5, 0.6, 0.7, 0.8, 0.9, 1.0, 1.1, or 1.2 wt % glucose linked only at positions 1 and 3. There can be about 0.1-1.2, 0.1-1.0, 0.1-0.8, 0.3-1.2, 0.3-1.0, 0.3-0.8, 0.4-1.2, 0.4-1.0, 0.4-0.8, 0.5-1.2, 0.5-1.0, 0.5-0.8, 0.6-1.2, 0.6-1.0, or 0.6-0.8 wt % glucose linked only at positions 1 and 3, in some instances.

In other embodiments, the dextran polymer can comprise about 0.1, 0.2, 0.3, 0.4, 0.5, 0.6, or 0.7 wt % glucose linked only at positions 1 and 4. There can be about 0.1-0.7, 0.1-0.6, 0.1-0.5, 0.1-0.4, 0.2-0.7, 0.2-0.6, 0.2-0.5, 0.2-0.4, 0.3-0.7, 0.3-0.6, 0.3-0.5, or 0.3-0.4 wt % glucose linked only at positions 1 and 4, in some instances.

In other embodiments, the dextran polymer can comprise about 7.7, 7.8, 7.9, 8.0, 8.1, 8.2, 8.3, 8.4, 8.5, or 8.6 wt % glucose linked only at positions 1, 3 and 6. There can be about 7.7-8.6, 7.7-8.5, 7.7-8.4, 7.7-8.3, 7.7-8.2, 7.8-8.6, 7.8-8.5, 7.8-8.4, 7.8-8.3, 7.8-8.2, 7.9-8.6, 7.9-8.5, 7.9-8.4, 7.9-8.3, 7.9-8.2, 8.0-8.6, 8.0-8.5, 8.0-8.4, 8.0-8.3, 8.0-8.2, 8.1-8.6, 8.1-8.5, 8.1-8.1, 8.1-8.3, or 8.1-8.2 wt % glucose linked only at positions 1, 3 and 6, in some instances.

In other embodiments, the dextran polymer can comprise about 0.4, 0.5, 0.6, 0.7, 0.8, 0.9, 1.0, 1.1, 1.2, 1.3, 1.4, 1.5, 1.6, or 1.7 wt % glucose linked only at (a) positions 1, 2 and 6, or (b) positions 1, 4 and 6. There can be about 0.4-1.7, 0.4-1.6, 0.4-1.5, 0.4-1.4, 0.4-1.3, 0.5-1.7, 0.5-1.6, 0.5-1.5, 0.5-1.4, 0.5-1.3, 0.6-1.7, 0.6-1.6, 0.6-1.5, 0.6-1.4, 0.6-1.3, 0.7-1.7, 0.7-1.6, 0.7-1.5, 0.7-1.4, 0.7-1.3, 0.8-1.7, 0.8-1.6, 0.8-1.5, 0.8-1.4, 0.8-1.3 wt % glucose linked only at (a) positions 1, 2 and 6, or (b) positions 1, 4 and 6, in some instances.

It is believed that dextran herein may be a branched structure in which there are long chains (containing mostly or all alpha-1,6-linkages) that iteratively branch from each other (e.g., a long chain can be a branch from another long chain, which in turn can itself be a branch from another long chain, and so on). The branched structure may also comprise short branches from the long chains; these short chains are believed to mostly comprise alpha-1,3 and -1,4 linkages, for example. Branch points in the dextran, whether from a long chain branching from another long chain, or a short chain branching from a long chain, appear to comprise alpha-1,3, -1,4, or -1,2 linkages off of a glucose involved in alpha-1,6 linkage. On average, about 20%, 21%, 22%, 23%, 24%, 25%, 26%, 27%, 28%, 29%, 30%, 15-35%, 15-30%, 15-25%, 15-20%, 20-35%, 20-30%, 20-25%, 25-35%, or 25-30% of all branch points of dextran in some embodiments branch into long chains. Most (>98% or 99%) or all the other branch points branch into short chains.

The long chains of a dextran branching structure can be similar in length in some aspects. By being similar in length, it is meant that the length (DP) of at least 70%, 75%, 80%, 85%, or 90% of all the long chains in a branching structure is within plus/minus 15% (or 10%, 5%) of the mean length of all the long chains of the branching structure. In some aspects, the mean length (average length) of the long chains is about 10-50 monomeric units (i.e., 10-50 glucose monomers). For example, the mean individual length of the long chains can be about 10, 15, 16, 17, 18, 19, 20, 21, 22, 23, 24, 25, 30, 35, 40, 45, 50, 10-50, 10-40, 10-30, 10-25, 10-20, 15-50, 15-40, 15-30, 15-25, 15-20, 20-50, 20-40, 20-30, or 20-25 DP.

Dextran long chains in certain embodiments can comprise substantially alpha-1,6-glycosidic linkages and a small amount (less than 2.0%) of alpha-1,3- and/or alpha-1,4-glycosidic linkages. For example, dextran long chains can comprise about, or at least about, 98%, 98.25%, 98.5%, 98.75%, 99%, 99.25%, 99.5%, 99.75%, or 99.9% alpha-1,6-glycosidic linkages. A dextran long chain in certain embodiments does not comprise alpha-1,4-glycosidic linkages (i.e., such a long chain has mostly alpha-1,6 linkages and a small amount of alpha-1,3 linkages). Conversely, a dextran long chain in some embodiments does not comprise alpha-1,3-glycosidic linkages (i.e., such a long chain has mostly alpha-1,6 linkages and a small amount of alpha-1,4 linkages). Any dextran long chain of the above embodiments may further not comprise alpha-1,2-glycosidic linkages, for example. Still in some aspects, a dextran long chain can comprise 100% alpha-1,6-glycosidic linkages (excepting the linkage used by such long chain to branch from another chain).

Short chains of a dextran molecule in some aspects are one to three glucose monomers in length and comprise less than about 5-10% of all the glucose monomers of the dextran polymer. At least about 90%, 91%, 92%, 93%, 94%, 95%, 96%, 97%, 98%, 99%, or all of, short chains herein are 1-3 glucose monomers in length. The short chains of a dextran molecule can comprise less than about 10%, 9%, 8%, 7%, 6% 5%, 4%, 3%, 2%, or 1% of all the glucose monomers of the dextran molecule, for example.

Short chains of a dextran molecule in some aspects can comprise alpha-1,2-, alpha-1,3-, and/or alpha-1,4-glycosidic linkages. Short chains, when considered all together (not individually) may comprise (i) all three of these linkages, or (ii) alpha-1,3- and alpha-1,4-glycosidic linkages, for example. It is believed that short chains of a dextran molecule herein can be heterogeneous (i.e., showing some variation in linkage profile) or homogeneous (i.e., sharing similar or same linkage profile) with respect to the other short chains of the dextran.

Dextran in certain embodiments can have a weight average molecular weight (Mw) of about, or at least about, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200 million (or any integer between 50 and 200 million) (or any range between two of these values). The Mw of dextran can be about 50-200, 60-200, 70-200, 80-200, 90-200, 100-200, 110-200, 120-200, 50-180, 60-180, 70-180, 80-180, 90-180, 100-180, 110-180, 120-180, 50-160, 60-160, 70-160, 80-160, 90-160, 100-160, 110-160, 120-160, 50-140, 60-140, 70-140, 80-140, 90-140, 100-140, 110-140, 120-140, 50-120, 60-120, 70-120, 80-120, 90-120, 100-120, 110-120, 50-110, 60-110, 70-110, 80-110, 90-110, 100-110, 50-100, 60-100, 70-100, 80-100, 90-100, or 95-105 million, for example. Any of these Mw's can be represented in weight average degree of polymerization (DPw), if desired, by dividing Mw by 162.14.

The z-average radius of gyration of a dextran herein can be about 200-280 nm. For example, the z-average Rg can be about 200, 205, 210, 215, 220, 225, 230, 235, 240, 245, 250, 255, 260, 265, 270, 275, or 280 nm (or any integer between 200-280 nm). As other examples, the z-average Rg can be about 200-280, 200-270, 200-260, 200-250, 200-240, 200-230, 220-280, 220-270, 220-260, 220-250, 220-240, 220-230, 230-280, 230-270, 230-260, 230-250, 230-240, 240-280, 240-270, 240-260, 240-250, 250-280, 250-270, or 250-260 nm.

The Mw and/or z-average Rg of dextran in some aspects can be measured following a protocol similar to, or the same as, the protocol disclosed in the examples. For example, a Mw and/or z-average Rg herein can be measured by first dissolving dextran produced by an 0768 gtf at 0.4-0.6 mg/mL (e.g., ~0.5 mg/mL) in 0.05-1.0 M (e.g., ~0.075 M) Tris(hydroxymethyl)aminomethane buffer with 150-250 ppm (e.g., ~200 ppm) $NaN_3$. Solvation of dry dextran can be achieved by shaking for 12-18 hours at 45-55° C. (e.g., ~50° C.). The resulting dextran solution can be entered into a suitable flow injection chromatographic apparatus comprising a separation module (e.g., ALLIANCE™ 2695 separation module from Waters Corporation, Milford, Mass.) coupled with three online detectors: a differential refractometer (e.g., Waters 2414 refractive index detector), a multiangle light scattering (MALS) photometer (e.g., Heleos™-2 18-angle multiangle MALS photometer) equipped with a quasielastic light scatering (QELS) detector (e.g., QELS detector from Wyatt Technologies, Santa Barbara, Calif.), and a differential capillary viscometer (e.g., VISCOSTAR™ differential capillary viscometer from Wyatt). Two suitable size-exclusion columns (e.g., AQUA-GEL-OH GUARD columns from Agilent Technologies, Santa Clara, Calif.) can be used to separate the dextran polymer peak from the injection peak, where the mobile phase can be the same as the sample solvent (above), the flow rate can be about 0.2 mL/min, the injection volumes can be about 0.1 mL, and column temperature can be about 30° C. Suitable software can be used for data acquisition (e.g., EMPOWER™ version 3 software from Waters) and for multidetector data reduction (ASTAR™ version 6 software from Wyatt). MALS data can provide weight-average molecular weight (Mw) and z-average radius of gyration (Rg), and QELS data can provide z-average hydrodynamic radius, for example.

The water insoluble α-(1,3-glucan) polymer forms a dispersion in water. In order to form the required aqueous coating composition, the water insoluble α-(1,3-glucan) polymer is dispersed and/or dissolved in an aqueous base, for example, aqueous alkali metal hydroxide, aqueous sodium hydroxide, or aqueous potassium hydroxide. In some embodiments, the alkali metal hydroxide is sodium hydroxide, while in other embodiments, the alkali metal hydroxide is potassium hydroxide. Combinations of both sodium and potassium hydroxide can also be used. The concentration of the alkali metal hydroxide in water can be in the range of from 2 to 10% by weight, based on the total weight of the water and the alkali metal hydroxide. In other embodiments, the concentration of the alkali metal hydroxide can be in the range of from 3 to 9% by weight or from 4 to 8% by weight, wherein the percentages by weight are based on the total weight of water and the alkali metal hydroxide.

The aqueous coating composition can be prepared by adding the water insoluble α-(1,3-glucan) polymer to an aqueous metal hydroxide solution and agitating until a solution forms. The water insoluble α-(1,3-glucan) polymer can be present in the range of from 0.1 to 50% by weight, based on the total weight of the aqueous coating composition. In one embodiment the water insoluble α-(1,3-glucan) polymer can be present in the range of from 5 to 30% by weight, based on the total weight of the aqueous coating composition. When the water insoluble α-(1,3-glucan) polymer is present at less than 5% by weight the continuous film forming ability of the coating composition is diminished, and when the concentration is above 30% by weight, then the viscosity of the aqueous coating composition increases to the point that it becomes difficult to form a uniform layer of the substrate. In other embodiments, the water insoluble α-(1,3-glucan) polymer can be present in the aqueous coating composition in the range of from 1 to 30% or 2 to 25% or 2 to 20% by weight, wherein the percentage by weight is based on the total weight of the aqueous coating composition.

In any given embodiment, the solubility limit of the water insoluble α-(1,3-glucan) polymer in the aqueous carrier, for example, the aqueous alkali metal hydroxide, is a function of the molecular weight of the water insoluble α-(1,3-glucan) polymer, the concentration of the aqueous base, the duration of mixing, the viscosity of the solution as it is being formed, the shear forces to which the solution is subject, and the temperature at which mixing takes place. In general, lower molecular weight water insoluble α-(1,3-glucan) polymer will be more soluble than higher molecular weight, other things being equal. Generally, higher shear mixing, longer mixing time, and higher temperature will be associated with higher solubility. The maximum temperature for mixing is limited by the boiling point of the aqueous base. The optimum concentration of the alkali metal hydroxide may change depending upon the other parameters in the mixing process.

The dextran polymer can form a solution in the aqueous carrier, for example, water. Agitating a mixture of the dextran polymer and the aqueous carrier forms the aqueous coating composition. The dextran can be present in the aqueous coating composition in the range of from 0.1 to 50% by weight, based on the total weight of the aqueous coating composition. In other embodiments, the dextran can be present in the range of from 5 to 30% or 1 to 30% or 2 to 25% or 2 to 20% by weight, wherein the percentage by weight is based on the total weight of the aqueous coating composition. In some embodiments, the coating composition consists essentially of the dextran polymer, the water insoluble α-(1,3-glucan) polymer, or a combination thereof.

The coating composition, in addition to the water insoluble α-(1, 3-glucan) polymer and/or the dextran polymer, can further comprise one or more additives. Suitable additives can include, for example, binders, dispersants, quaternary ammonium salts, calcium chloride, calcium silicate; surfactants, for example, cationic surfactants, anionic surfactants, non-ionic surfactants, amphoteric surfactants, fluorinated surfactants; hardeners, for example, active halogen compounds, vinylsulfone compounds, epoxy compounds; dispersing agents, for example, polyacrylates, polyphosphates, polycarboxylates; flowability improvers;

lubricants, for example, calcium, ammonium and/or zinc stearate, wax or wax emulsions, alkyl ketene dimer, glycols; antifoam agent, for example, octyl alcohol, silicone-based antifoam agents; releasing agents; foaming agents; penetrants, for example, 1,2-propane diol, triethyleneglycol butyl ether, 2-pyrrolidone; optical brighteners, for example, fluorescent whiteners; preservatives, for example, benzoisothiazolone and isothiazolone compounds; biocides, for example, metaborate, thiocyanate, sodium benzoate, benzisothiaolin-3-one; yellowing inhibitors, for example, sodium hydroxymethyl sulfonate, sodium p-toluenesulfonate; ultraviolet absorbers, for example, benzotriazole compounds; antioxidants, for example, sterically hindered phenol compounds; insolubilisers; antistatic agents; pH regulators, for example, weak bases, primary, secondary or tertiary amines, sulfuric acid, hydrochloric acid; water-resistance agents, for example, ketone resin, anionic latex, glyoxal; wet and/or dry strengthening agents, for example, glyoxal based resins, oxidized polyethylenes, melamine resins, urea formaldehyde; cross-linking agents; gloss-ink holdout additives; grease and oil resistance additives; leveling aids, for example, polyethylene emulsions, alcohol/ethylene oxide or combinations thereof. The coating composition can contain any one or more of the listed additives in an amount in the range of from 0 to 5% by weight, based on the total amount of the coating composition. In other embodiments, the additives can be present in an amount in the range of from 0.1 to 4% by weight or 0.5 to 3.5% by weight or 0.5 to 3% by weight. All percentages by weight are based on the total amount of the coating composition.

Suitable binders can include, for example, polyvinyl alcohol, polyvinyl acetate, partially saponified polyvinyl acetate, silanol-modified polyvinyl alcohol, polyurethane, starch, corn dextrin, carboxy methyl cellulose, cellulose ethers, hydroxyethyl cellulose, hydroxypropyl cellulose, ethylhydroxyethyl cellulose, methyl cellulose, alginates, sodium alginate, xanthan, carrageenan, casein, soy protein, guar gums, synthetic polymers, styrene butadiene latex, styrene acrylate latex or a combination thereof. In some embodiments, the binder is polyvinyl alcohol. In other embodiments, the binder is a combination of two or more of polyvinyl alcohol, a silanol-modified polyvinyl alcohol and polyvinyl acetate. In some embodiments, the coating composition is free from the binder. In other embodiments, the coating composition is free from starch and/or hydroxyalkyl starch. In other embodiments, the coating composition is free from water soluble polysaccharides. As used herein, the phrase free from means that the coating composition contains less than 1% by weight of the component, or less than 0.5% by weight or less than 0.1% by weight or less than 0.01% by weight of the component. In still further embodiments, free from means that the particular component is undetectable by $^1$H NMR.

If present, the additives can be added at any point if the process of forming the aqueous coating composition. The additives can be dispersed and/or dissolved in the aqueous alkali metal hydroxide, before the water insoluble α-(1,3-glucan) polymer is added, during the addition of the water insoluble α-(1,3-glucan) polymer or after the addition of the water insoluble α-(1,3-glucan) polymer. In other embodiments, the additives can be dispersed and/or dissolved in water, before the dextran polymer is added, during the addition of the dextran polymer or after the addition of the dextran polymer.

The substrate can be any substrate for which grease and/or oil resistance is desired. This is especially desired in the food industry where grease and oil resistance is needed. In some embodiments, the substrate can be a porous substrate such as paper and textiles, or on hard substrates such as wood, metal or masonry. In some embodiments, the substrate can be, for example, a cellulose substrate, a polymer, paper, a textile, paperboard, cardboard, or corrugated board.

The present disclosure also relates to a method comprising:
1) providing an aqueous coating composition comprising A) water insoluble α-(1,3-glucan) polymer having 90% or greater α-1,3-glucosidic linkages, less than 1% by weight of α-1,3,6-glucosidic branch points and a number average degree of polymerization in the range of from 55 to 10,000 in aqueous alkali metal hydroxide and/or B) dextran wherein the dextran comprises:
   (i) 87-93% α-1,6-glycosidic linkages;
   (ii) 0.1-1.2% α-1,3-glycosidic linkages;
   (iii) 0.1-0.7% α-1,4-glycosidic linkages;
   (iv) 7.7-8.6% α-1,3,6-glycosidic linkages; and
   (v) 0.4-1.7% α-1,2,6-glycosidic or α-1,4,6-glycosidic linkages;
   wherein the weight-average molecular weight (Mw) of the dextran is about 50-200 million Daltons, and the z-average radius of gyration of the dextran is about 200-280 nm;
2) applying a layer of the aqueous coating composition to at least a portion of a substrate; and
3) removing at least a portion of the water from the applied layer; wherein the dried layer of coating composition forms a continuous layer on the substrate.

The layer of aqueous coating composition can be applied to at least a portion of the substrate. In some embodiments, the layer can be applied via any method known in the art, for example, air knife coating, rod coating, bar coating, wire bar coating, spray coating, brush coating, cast coating, flexible blade coating, gravure coating, jet applicator coating, short dwell coating, slide hopper coating, curtain coating, flexographic coating, size-press coating, reverse roll coating and transfer roll coating. The aqueous coating composition can be applied on at least a portion of the substrate, for example, on a single side or both sides of the substrate, a portion of a single side, or a portion of both sides of a flat substrate. The aqueous coating can be applied once to the substrate or multiple times to the substrate.

After application of the layer of the aqueous coating composition to at least a portion of the substrate, at least a portion of the water can be removed from the applied layer of aqueous coating composition to produce the continuous layer of coating composition. The water can be removed by evaporation, heating, or a combination thereof. For example, air or convection drying, linear tunnel drying, arc drying, air-loop drying, contact or conduction drying, radiant energy drying, infrared drying, microwave drying, or a combination thereof may be used. The coated substrate can optionally be calendared after drying in order to improve the surface smoothness and gloss. Calendaring can be carried out by passing the coated substrate through nips and rollers one or more times.

The method can comprise the further step of 4) washing the applied layer of coating composition with water. The step of washing the applied layer of coating composition can be done prior to step 3) or after step 3). Washing the applied layer of coating composition can help to remove at least a portion of the alkali metal hydroxide. In some embodiments the water can be substituted with an acid or an aqueous acid. For example, acetic acid, aqueous acetic acid, aqueous hydrochloric acid, aqueous sulfuric acid, aqueous citric acid, or other aqueous acids may be used.

The aqueous coating composition can be applied to the substrate at such a rate as to apply a dry coating weight in the range of from 0.1 to 30 grams/meter$^2$ (g/m$^2$). In other embodiments, the dry coating weight can be in the range of from 0.5 to 25 g/m$^2$ or 1 to 20 g/m$^2$. The dried layer of coating composition can have a thickness in the range of from 0.1 to 50 micrometers (μm). In other embodiments, the thickness can be in the range of from 0.5 to 40 μm or 1 to 30 μm or 1 to 20 μm.

Non-limiting examples of the embodiments disclosed herein include:

1. A substrate wherein at least a portion of the substrate is coated with a continuous layer of a coating composition, wherein the coating composition comprises A) water insoluble α-(1,3-glucan) polymer having 90% or greater α-1,3-glycosidic linkages, less than 1% by weight of α-1,3,6-glycosidic branch points and a number average degree of polymerization in the range of from 55 to 10,000 and/or B) a dextran comprising:
   (i) 87-93% α-1,6 glycosidic linkages;
   (ii) 0.1-1.2% α-1,3-glycosidic linkages;
   (iii) 0.1-0.7% α-1,4-glycosidic linkages;
   (iv) 7.7-8.6% α-1,3,6-glycosidic linkages; and
   (v) 0.4-1.7% α-1,2,6-glycosidic or α-1,4,6-glycosidic linkages;
   wherein the weight-average molecular weight (Mw) of the dextran is about 50-200 million Daltons, and the z-average radius of gyration of the dextran is about 200-280 nm and the dextran.

2. The substrate of embodiment 1 wherein the water insoluble α-(1,3-glucan) polymer is produced by a glucosyltransferase enzyme having 90% or greater sequence identity to Gtf J.

3. The substrate of any one of embodiments 1 or 2 wherein the water insoluble α-(1,3-glucan) polymer comprises greater than or equal to 95% α-1,3-glycosidic linkages.

4. The substrate of any one of embodiments 1, 2 or 3 wherein the coating composition further comprises one or more additives.

5. The substrate of any one of embodiments 1, 2, 3 or 4 wherein the coating composition is essentially free from starch or hydroxyalkyl starch.

6. The substrate of any one of embodiments 1, 2, 3, 4 or 5 wherein the water insoluble α-(1,3-glucan) polymer is a linear polymer having greater than or equal to 99% of α-1,3-glucosydic linkages and less than 1% α-1,3,6-branching points.

7. The substrate of any one of embodiments 1, 2, 3, 4, 5 or 6 wherein the substrate resists grease and/or oil.

8. The substrate of any one of embodiments 1, 2, 3, 4, 5, 6 or 7 wherein the dried layer of α-(1,3-glucan) polymer forms a layer having a thickness in the range of from 0.1 micrometers to 50 micrometers.

9. The substrate of any one of embodiments 1, 2, 3, 4, 5, 6, 7 or 8 wherein the substrate is a cellulose substrate, a polymer, paper, a textile, paperboard, cardboard, or corrugated board.

10. A method comprising:
    1) providing an aqueous coating composition comprising A) water insoluble α-(1,3-glucan) polymer having 90% or greater α-1,3-glycosidic linkages, less than 1% by weight of α-1,3,6-glycosidic branch points and a number average degree of polymerization in the range of from 55 to 10,000 in aqueous alkali metal hydroxide and/or B) dextran in water wherein the dextran comprises
    (i) 87-93% α-1,6 glycosidic linkages;
    (ii) 0.1-1.2% α-1,3-glycosidic linkages;
    (iii) 0.1-0.7% α-1,4-glycosidic linkages;
    (iv) 7.7-8.6% α-1,3,6-glycosidic linkages; and
    (v) 0.4-1.7% α-1,2,6-glycosidic or α-1,4,6-glycosidic linkages;
    wherein the weight-average molecular weight (Mw) of the dextran is about 50-200 million Daltons, and the z-average radius of gyration of the dextran is about 200-280 nm and the dextran;
    2) applying a layer of the aqueous coating composition to at least a portion of a substrate; and
    3) removing at least a portion of the water from the applied layer; wherein the dried layer of coating composition forms a continuous layer on the substrate.

11. The method of embodiment 10 wherein the method further comprises washing the applied layer with water prior to or after step 3) removing at least a portion of the water.

12. The method of any one of embodiments 10 or 11 wherein the method further comprises washing the applied layer with an aqueous acid prior to or after step 3) removing at least a portion of the water.

13. The method of any one of embodiments 10, 11 or 12 wherein the dried layer has a thickness in the range of from 0.1 micrometers to 50 micrometers.

14. The method of any one of embodiments 10, 11, 12 or 13 wherein the removal of water step is performed by evaporation, heating, or a combination thereof.

15. The substrate of embodiment 1 wherein the dextran comprises:
    (i) about 89.5-90.5 wt % glucose linked at positions 1 and 6;
    (ii) about 0.4-0.9 wt % glucose linked at positions 1 and 3;
    (iii) about 0.3-0.5 wt % glucose linked at positions 1 and 4;
    (iv) about 8.0-8.3 wt % glucose linked at positions 1, 3 and 6; and
    (v) about 0.7-1.4 wt % glucose linked at:
        (a) positions 1, 2 and 6, or
        (b) positions 1, 4 and 6.

16. The substrate of any one of embodiments 1 or 15 wherein the dextran comprises chains linked together within a branching structure, wherein the chains are similar in length and comprise substantially alpha-1,6-glycosidic linkages.

17. The substrate of any one of embodiments 1, 15 or 16 wherein the average length of the chains is about 10-50 monomeric units.

18. The substrate of any one of embodiments 1, 15, 16 or 17 wherein the weight average molecular weight of the dextran is 80-120 million daltons.

19. The substrate of any one of embodiments 1, 15, 16, 17 or 18 wherein the z-average radius of gyration of the dextran is 230-250 nm.

20. A substrate wherein at least a portion of the substrate is coated with a continuous layer of a coating composition, wherein the coating composition comprises a quaternary ammonium poly alpha-1,3-glucan.

21. The substrate of embodiment 20 wherein the coating composition further comprises one or more additives.

22. The substrate of embodiment 20 or 21 wherein the coating composition is essentially free from starch or hydroxyalkyl starch.

23. The substrate of embodiment 20, 21, or 22 wherein the substrate resists grease and/or oil.

24. The substrate of embodiment 20, 21, 22, or 23 wherein the dried layer has a thickness in the range of from 0.1 micrometers to 50 micrometers.

25. The substrate of embodiment 20, 21, 22, 23, or 24 wherein the substrate is a cellulose substrate, a polymer, paper, a textile, paperboard, cardboard, or corrugated board.

Examples

Unless otherwise stated, all ingredients are available from Sigma-Aldrich, St. Louis, Mo.

PENFORD® Gum 270 starch is available from Ingredion, Inc., Westchester, Ill.

The water insoluble α-(1,3-glucan) polymer was produced according to a method of U.S. Pat. No. 8,871,474. The polymer had a number average degree of polymerization of about 300 and >98% α-1,3 glycosidic linkages.

Preparation of Coating Composition #1

14.99 grams of glucan polymer #1 was mixed with 40.01 grams of water and stirred using a rotor stator until a homogeneous dispersion was obtained. 5.02 grams of 40% sodium hydroxide solution was then added to the dispersion and the stirring was continued until a solution formed.

Preparation of Comparative Coating Composition A

PENFORD® gum 270 19.98 grams was mixed with 80.04 grams of water and stirred until a uniform slurry formed. The mixture was heated while mixing until the mixture thickened. The heat source was removed and the mixture was stirred by hand until it was cool enough to coat onto the substrate.

Grease and Oil Resistance Tests

All testing was performed using the Technical Association of the Pulp and Paper Industry (TAPPI) Test Method T-559.

Coating compositions were applied to food wrapper grade paper using a Myer bar with the gap set at 0.127 millimeter (mm) or 0.203 mm. The coated papers were then dried in a convection oven. When tested using the TAPPI test, Comparative Coating Composition A failed test #1 while Coating Composition #1 passed tests #1 and #5.

Preparation of Coating Composition #2

A 12% by weight solution of the water insoluble α-(1,3-glucan) polymer in 4.5% by weight solution of aqueous NaOH was produced by stirring until a solution formed.

NK-40 type unbleached Kraft paper was used as the substrate.

Following procedures common in the paper industry, the glucan solution was hand coated onto NK-40 type unbleached kraft paper substrate. The weight difference between the freshly coated paper and the uncoated paper multiplied by the % solids (in this case 16.5%) and divided by the area of the coated paper to provide a measure of the coating weight. Coatings were done using a "0", a "10" and a "20" Mayer rod for the hand coating of the paper. The coatings were done in triplicate. The average and relative standard error of the coating weight is shown in Table 1 below. The coated paper was dried at 105° C. for 5 min. The paper was then allowed to stand at room temperature for at least 24 hours.

TABLE 1

| Rod number | Average coat weight (g/m$^2$) | Relative standard error (3 replicates) | TAPPI Kit value | Gurley porosity (seconds/100 ml of air to pass through the coated paper) | Sheffield roughness |
| --- | --- | --- | --- | --- | --- |
| Control | 0 | 0 | 0 | 11 +/− 0.3 | 407 +/− 0.7 |
| 0 | 4.2 | 4.7% | 2 | 2464 +/− 1330 | 372 +/− 9 |
| 10 | 5.7 | 1.4% | 3 | 3320 +/− 893 | 377 +/− 10 |
| 20 | 7.7 | 3.5% | 5 | Out of range >21000 | |

The grease resistance was measured using the standard "kit" type test (TAPPI T559 standard). The Glucan coating imparted a dramatic improvement in the grease resistance of the Kraft paper for all coating weights. The "Gurley" porosity and "Sheffield" roughness of the coated paper was measured using a "PROFILE Plus Roughness and Porosity tester" manufactured by the Technidyne Corporation, New Albany, Ind., following TAPPI T-460 and TAPPI T536-88 standards. The results of these measurements are also shown in the table above. The porosity of the coated paper dropped dramatically as indicated by the higher Gurley numbers. At the highest coating weight, the Gurley porosity value was too high to accurately measure. The coating imparted a smoother surface to the paper as indicated by the Sheffield roughness parameter.

Preparation of Dextran Polymer

Expression of a Glucosyltransferase (0768) in *E. coli* and Production of Active Crude Enzyme Lysate This Example describes expression of a mature glucosyltransferase (gtf) enzyme in *E. coli*. Crude cell lysate of an *E. coli* expression strain was produced and showed gel product-forming activity in the presence of sucrose.

A putative YG repeat-containing hydrolase (categorized in GENBANK under GI number 339480768, but now having GI number 497964659) with 1484 amino acids was identified from *Leuconostoc pseudomesenteroides* strain KCTC3652 by whole genome shotgun sequencing. This putative glucosyltransferase (designated herein as gtf 0768) belongs to the GH70 family of glycosyl hydrolases containing a glucan-binding domain. The N-terminal 37 amino acid segment of gtf 0768 was deduced as the signal peptide of the enzyme by the SIGNALP 4.0 program (Petersen et al., *Nature Methods* 8:785-786).

To construct a plasmid for bacterial expression of gtf 0768, a DNA sequence encoding a mature form of the gtf without the signal peptide was synthesized by GenScript USA Inc. (Piscataway, N.J.). The synthesized sequence was subcloned into the NheI and HindIII sites of the pET23D+ vector (NOVAGEN®; Merck KGaA, Darmstadt, Germany). The 0768 gtf (SEQ ID NO:2) encoded by this construct included a start methionine and 3 additional amino acids (Ala-Ser-Ala) at the N-terminus, and 6 histidine residues at the C-terminus, compared to the wild type mature (predicted) form of gtf 0768. The plasmid construct was sequence-confirmed and transformed into *E. coli* BL21 DE3 host cells with ampicillin selection, resulting in expression strain EC0052.

Cells of EC0052 and a control strain containing only empty pET23D+ vector were grown in LB medium with 100 μg/mL ampicillin to OD$_{600}$~0.5, and then induced with 1 mM IPTG at 37° C. for 3 hours or alternatively induced at 23° C. overnight. Following this induction period, cells were collected by centrifugation at 4000×g for 10 min and resuspended in PBS buffer pH 6.8. The cells were then lysed by passing through a French Press at 14,000 psi (96.53 MPa) twice, after which cell debris was pelleted by centrifugation at 15,000×g for 20 min. The supernatants of each crude cell lysate were aliquoted and frozen at −80° C.

The activity of crude cell lysate from EC0052 cells was checked by reaction with sucrose. A control reaction was set up similarly using cell lysate prepared from cells containing the empty vector. Each sucrose reaction was set up using 10% (v/v) of cell lysate with 100 g/L sucrose, 10 mM sodium citrate pH 5, and 1 mM $CaCl_2$). After incubation of the reactions at 37° C. for a few hours, a gel-like product, believed to be a dextran, was formed in the tube in which EC0052 cell lysate had been added. No gel-like product was formed in the control reaction. HPLC analysis confirmed that sucrose was consumed in the reaction containing EC0052 cell lysate, and not in the control reaction. This result suggested that the EC0052 crude cell lysate expressed active gtf 0768 enzyme, and that this gtf produced a dextran product having high viscosity.

Preparation of Dextran Polymer #1

A 12 liter reaction was prepared containing 20 mM sodium phosphate buffer (buffer was diluted 50-fold with ddH2O from 1 M stock, pH 6.5), 100 g/L sucrose, and 25 units (2 milliliters/liter) of the gtf 0768 enzyme solution, produced above. The reaction was shaken at 100 rpm in an incubator shaker (Innova, Model 4000) at 25° C. for 27 hours.

The gtf enzyme was deactivated by heating the reaction at 85° C. for 10 minutes. The deactivated viscous reaction was then mixed with methanol to precipitate the viscous product. A white precipitate was formed. After carefully decanting the supernatant, the white precipitate was washed twice with methanol. The solid product was dried at 45° C. under vacuum in an oven for 48 hours.

Samples (1 mL) of the reaction were taken at 0, 0.5, 1, 2, and 24 hours, respectively. The gtf enzyme was deactivated in each sample by heating at 80° C. for 10 minutes. Each sample was then diluted 10-fold with sterile water. 500 µL of diluted sample was transferred into a centrifuge tube filter (SPIN-X, 0.45-µm Nylon, 2.0 mL Polypropylene Tube, Costar #8170) and centrifuged at 12,000 rpm in a table centrifuge for 60 minutes, after which 200 µL of flowthrough was used for HPLC analysis to measure sucrose consumption during the reaction. The following HPLC conditions were applied for analyzing each sample: column (AMINEX HPX-87C carbohydrate column, 300×7.8 mm, Bio-Rad, No. 125-0095), eluent (water), flow rate (0.6 mL/min), temperature (85° C.), refractive index detector. HPLC analysis of the samples indicated substantial sucrose consumption during the 0768 gtf reaction.

HPLC was also used to analyze other products of the reaction. Polymer yield was back-calculated by subtracting the amount of all other saccharides left in the reaction from the amount of the starting sucrose. The back-calculated number was consistent with the viscous product dry weight analysis. Sucrose, leucrose, glucose and fructose were quantified by HPLC with an HPX-87C column (HPLC conditions as described above). DP2-7 oligosaccharides were quantified by HPLC with the following conditions: column (AMINEX HPX-42A carbohydrate column, 300×7.8 mm, Bio-Rad, No. 125-0097), eluent (water), flow rate (0.6 mL/min), temperature (85° C.), refractive index detector. These HPLC analyses indicated that the glucosyl-containing saccharide products of the 0768 gtf reaction consisted of 92.3% polymer product, 1.3% glucose, 5.0% leucrose, and 1.4% DP2-7 oligosaccharides.

A sample of dry dextran powder product (~0.2 g) of the above reaction was used for molecular weight analysis. Molecular weight was determined by a flow injection chromatographic method using an ALLIANCE™ 2695 separation module from Waters Corporation (Milford, Mass.) coupled with three online detectors: a differential refractometer 2414 from Waters, a HELEOS™-2 18-angle multi-angle light scattering (MALS) photometer with quasielastic light scattering (QELS) detector from Wyatt Technologies (Santa Barbara, Calif.), and a VISCO STAR™ differential capillary viscometer from Wyatt. The dry dextran powder was dissolved at 0.5 mg/mL in aqueous Tris (Tris[hydroxymethyl]aminomethane) buffer (0.075 M) containing 200 ppm NaN3. The dissolution of dextran was achieved by shaking overnight at 50° C. Two AQUAGEL-OH GUARD columns from Agilent Technologies (Santa Clara, Calif.) were used to separate the dextran polymer peak from the injection peak. The mobile base for this procedure was the same as the dextran solvent, the flow rate was 0.2 mL/min, the injection volume was 0.1 mL, and the column temperature was 30° C. EMPOWER™ version 3 software from Waters was used for data acquisition, and ASTRA™ version 6 software from Wyatt was used for multidetector data reduction. It was determined that the dextran polymer product had a weight-average molecular weight (Mw) of 78.6× $10^6$ g/mol (i.e., roughly 78 million Daltons) (from MALS analysis), a z-average radius of gyration of 213 nm (from MALS analysis), and a z-average hydrodynamic radius of 187 nm (from QELS analysis).

Paper Coating Comprising Dextran Polymer #1

12 and 15 percent by weight aqueous solutions of dextran polymer #1 were prepared using deionized water. The mixtures were stirred until a solution formed. The aqueous coating composition was coated onto NK-40 type unbleached Kraft paper using a one or more Mayer rods. The coated paper was dried for 5 minutes at 105° C. and was then allowed to stand at room temperature overnight. The average coating weight for three replications was 6.4 grams/meter$^2$ with a relative standard error of 2.5%.

TABLE 2

| % dextran | Mayer Rod | Avg Coating weight (g/m$^2$) | Kit Value | Gurley Porosity | Sheffield Roughness |
|---|---|---|---|---|---|
| 0 (control) | | 0 | 0 | 11 ± 0.3 | 407 ± 0.7 |
| 12 | 0 | 3.4 | <1 | 1539 ± 229 | 380 ± 11 |
| 12 | 10 | 5.1 | 3-4 | 10791 ± 5844 | 383 ± 6 |
| 12 | 20 | 6.7 | 7-8 | >21000 | na |
| 15 | 20 | 8.1 | 10-11 | na | na | na means data not measured.

The grease resistance was measured using the standard "kit" type test (TAPPI T559 standard), with three replications per test. Using the above dextran coated paper and the same type of paper with no coating as a control. The control paper failed at kit value 0, while the dextran coated paper failed at up to kits 3-4, 7-8 or 10-11, depending on the coating thickness, indicating a much improved resistance to grease compared to the untreated control. The "Gurley" porosity measures the amounts of seconds it takes for 100 milliliters of air to pass through the coated paper. Both Gurley porosity and Sheffield roughness of the coated paper was measured using a "PROFILE Plus Roughness and Porosity tester" manufactured by Technidyne following TAPPI T-460 and TAPPI T536-88 standards.

Several polysaccharides, including chemically modified ones, were used to assess the grease barrier properties of coating compositions comprising the polysaccharides on paper. All coating compositions were water based. Each coating composition was prepared with the desired solid concentration shown in Table 3. The polymer solutions were directly dissolved into water with mixing, as described below.

Preparation of Coating Composition #3

This coating composition comprised Dextran Polymer #2. Dextran was prepared as disclosed in US Patent Application Publication 2016/0122445 A1. A 10 percent by weight aqueous solution of dextran polymer #2 was prepared.

Preparation of Comparative Coating Composition B

A comparative coating composition containing 10 percent by weight of polyvinyl alcohol (Elvanol 80-18) in water was prepared. This comparative composition did not contain polysaccharide.

Preparation of Coating Composition #4 This coating composition comprised 75% polyvinyl alcohol and 25% α-(1,3-glucan) polymer. The glucan polymer was dispersed in a PVOH solution so that the final composition had 75 parts by weight of PVOH and 25 parts by weight of glucan. The polyvinyl alcohol (PVOH) was heated to 70-90° C. to solubilize it.

Preparation of Coating Composition #5

This coating composition comprised quaternary ammonium poly alpha-1,3-glucan, specifically trimethylammonium hydroxypropyl poly alpha-1,3-glucan. Quaternary ammonium poly alpha-1,3-glucans and their preparation are described in published patent application WO 2015/195960. 10 g of poly alpha-1,3-glucan (Mw [weight-average molecular weight]=168,000) was added to 100 mL of isopropanol in a 500-mL capacity round bottom flask fitted with a thermocouple for temperature monitoring and a condenser connected to a recirculating bath, and a magnetic stir bar. 30 mL of sodium hydroxide (17.5% solution) was added dropwise to this preparation, which was then heated to 25° C. on a hotplate. The preparation was stirred for 1 hour before the temperature was increased to 55° C. 3-chloro-2-hydroxypropyl-trimethylammonium chloride (31.25 g) was then added to provide a reaction, which was held at 55° C. for 1.5 hours before being neutralized with 90% acetic acid. The solid thus formed (trimethylammonium hydroxypropyl poly alpha-1,3-glucan) was collected by vacuum filtration and washed with ethanol (95%) four times, dried under vacuum at 20-25° C., and analyzed by NMR and SEC to determine molecular weight and DoS. The DoS was 0.8.

Each of the above coating compositions were hand-coated onto 175 or 176 g/m$^2$ Kraft Cardstock (Recollections, 651b/176 gsm) substrate using a Mayer Rod. The uncoated cardstock is referred to as "base paper" in the Table below and in the following description of the coating procedure. The base paper to be used for hand drawdown coating was placed on a smooth surface and the edge taped to secure it to the surface. The desired coating rod (bar) on the top of the base paper, 3-5 cm to the top and the coating solution (2-5 ml) is applied evenly below the coating rod (bar) in a line. Two hands held each side of the rod (bar) and the rod was drawn down from the top to the end of the paper with a constant steady speed, applying evenly pressure on both sides. The rod should not be rotated during the drawdown process. The wet coated paper was placed on a flat surface with weight or tape on the edges to avoid curling while drying. To accelerate drying, a fan/hot gun can be used to dry the surface.

The coated substrates were dried for 5 minutes at 105° C. Coating weight was determined by the difference in mass between uncoated and coated paper, normalized by the area.

The grease barrier properties of the coating compositions were evaluated using the standard "KIT" type test following TAPPI T559 cm-02 test. The values are from 1 to 12 (1 being the poorest performance and 12 being the best). Results are presented in Table 3.

PVOH is known to have excellent grease barrier properties and many of the polysaccharide-based coating compositions showed comparable grease barrier performance at similar coating weights (see table below for details).

TABLE 3

| Coating Composition | Coating Solid (wt %) | Base Paper (GSM) | Coating Thickness (micron) | Cal'd * Coating Weight (GSM) | Coating Weight (GSM) | Grease Barrier Kit (unfolded) # |
|---|---|---|---|---|---|---|
| Base paper | 0 | 175 | 0.0 | 0.0 | 0.0 | 0.0 |
| #3 | 10 | 175 | 13.7 | 1.4 | 2.2 | 7.0 |
| #3 | 10 | 175 | 45.7 | 4.6 | 3.6 | 8.5 |
| #3 | 10 | 175 | 80.0 | 8.0 | 11.3 | 10.7 |
| Comparative B | 10 | 175 | 13.7 | 1.4 | 5.2 | 11.5 |
| Comparative B | 10 | 175 | 45.7 | 4.6 | 6.7 | 11.5 |
| Comparative B | 10 | 175 | 80.0 | 8.0 | 17.3 | 12.0 |
| #4 | 10 | 176 | 13.7 | 1.4 | 1.4 | 9.8 |
| #4 | 10 | 176 | 45.7 | 4.6 | 3.9 | 10.5 |
| #4 | 10 | 176 | 80.0 | 8.0 | 13.3 | 12.0 |
| #5 | 10 | 176 | 13.7 | 1.4 | 1.9 | 8.0 |
| #5 | 10 | 176 | 45.7 | 4.6 | 4.6 | 10.8 |
| #5 | 10 | 176 | 80.0 | 8.0 | 8.5 | 12.0 |

Notes:
* "Cal'd" means calculated
The values are averages of four measurements Barrier against mineral oil saturated hydrocarbons (MOSH) and mineral oil aromatic hydrocarbon (MOAH) are becoming increasingly important as the use of recycled paper (with increasing amounts of ink contamination) is increasing. Thus, barrier coatings are required to avoid migration of mineral oil, particularly in papers used for food packaging. The lower the MOSH and MOAH values the better the coating performance.

Three coating compositions were evaluated for MOSH and MOAH barrier protection. The coating compositions were as described herein above. Coating weights and results are reported in Table 4.

The MOSH and MOAH (10 day, 40° C.) barrier analysis was carried out according to the method detailed in "Barriers Against the Migration from Recycled Paper Board into Food: Measuring Efficiency by Surrogate Components" (Biedermann-Brem and Krob, Pack Techno. Sci, February 2014). A paper (donor) is spiked with mineral oil (Gravex 913) and the testing barrier are placed in a migration cell. Tenax® (receptor) is used as an absorbent for the migrated mineral oil (no direct contact with the sample). The tightly capped migration cells were stored at 40° C. for 10 days. Following this, the Tenax® was extracted with an organic solvent and the extract was measured with online-HPLC-GC-FID on mineral oil. In addition to duplicates of every sample, a positive control (instead of the permeable paper) and a negative control (aluminum foil used as a barrier) were also run. All coated substrate samples had dimensions of 10 cm×10 cm.

The MOSH and MOAH results in Table 4 show that coating compositions containing water soluble cationic glucan as in Coating Composition #5 show exceptional barrier performance, comparable to that of PVOH.

TABLE 4

| Coating Composition | Coating weight (g/m$^2$) | Spiked amount on the paper (donor) | MOSH (ug absolute) | MOAH (ug absolute) |
|---|---|---|---|---|
| Blank | 0 | 610 ug | 670 | 225 |
|  |  | ~1000 mg/kg | 650 | 225 |
| #3 | 12 | 610 ug | 560 | 175 |
|  |  | ~1000 mg/kg | 570 | 185 |
| Comparative B | 13 | 610 ug | 3.7 | <2 |
|  |  | ~1000 mg/kg | 4.9 | <2 |
| #5 | 12 | 610 ug | 14 | 3 |
|  |  | ~1000 mg/kg | 13 | 3 |

What is claimed is:

1. A coated substrate that comprises: a substrate and wherein at least a portion of the substrate is coated with a continuous layer of a coating composition,
   wherein the coating composition comprises polyvinyl alcohol and a water-insoluble α-1,3-glucan polymer having 90% or greater α-1,3-glycosidic linkages, and the substrate is paper, paper board, cardboard, or corrugated board.

2. The coated substrate of claim 1, wherein the water-insoluble α-1,3-glucan polymer comprises greater than or equal to 95% α-1,3-glycosidic linkages.

3. The coated substrate of claim 1, wherein the coating composition further comprises one or more additives.

4. The coated substrate of claim 1, wherein the coating composition is essentially free from starch or hydroxyalkyl starch.

5. The coated substrate of claim 1, wherein the water-insoluble α-1,3-glucan polymer has greater than or equal to 99% α-1,3-glycosidic linkages.

6. The coated substrate of claim 1, wherein the coated substrate resists grease and/or oil.

7. The coated substrate of claim 1, wherein the continuous layer is dry and has a thickness in the range of 0.1 to 50 micrometers.

8. The coated substrate of claim 1, wherein the substrate is paper.

9. The coated substrate of claim 1, wherein the water-insoluble α-1,3-glucan polymer has less than 1% α-1,3,6-glycosidic branch points.

10. The coated substrate of claim 1, wherein the water-insoluble α-1,3-glucan polymer has a number average degree of polymerization in the range of 55 to 10,000.

11. The coated substrate of claim 1, wherein the water-insoluble α-1,3-glucan polymer consists of α-1,3-glucan.

12. The coated substrate of claim 1, wherein grease is in contact with the continuous layer of the coating composition, but the grease is not in contact with the substrate.

13. The coated substrate of claim 1, wherein oil is in contact with the continuous layer of the coating composition, but the oil is not in contact with the substrate.

* * * * *